United States Patent Office 3,825,626
Patented July 23, 1974

3,825,626
ETHYLENE POLYMER COMPOSITION HAVING ENHANCED PHOTODEGRADABILITY
Michael Calvin McGaugh, Angleton, Tex., assignor to The Dow Chemical Company, Midland, Mich.
No Drawing. Filed July 6, 1971, Ser. No. 160,139
Int. Cl. C08f 15/04
U.S. Cl. 260—897 A                         5 Claims

ABSTRACT OF THE DISCLOSURE

Photodegradability of ethylene polymer containing a photosensitizing material is enhanced by incorporating therein a minor amount of polypropylene. The resultant photodegradable blends are useful as molding or extrusion compositions for the production of disposable plastic articles, e.g., wrappings, containers, etc., which degrade rapidly when exposed to sunlight and other ultraviolet light sources.

BACKGROUND OF THE INVENTION

This invention relates to ethylene polymer compositions and articles fabricated therefrom which degrade rapidly when exposed to ultraviolet light.

Ethylene polymers are widely utilized in the fabrication of relatively light weight, disposable articles having excellent flexibility over a wide range of temperatures and exhibiting chemical inertness toward aqueous and non-aqueous liquids.

As a result of their wide spread utility in the production of disposable articles, particularly in the packaging field, and as result of their physical properties which enable them to withstand long exposure to the elements before they are decayed or degraded, the careless discard of such articles of ethylene polymers create a real litter problem for the ecology of populated areas. Such articles must be collected and burned, thereby possibly polluting the air, or allowed to remain where they are used and discarded, thereby littering the landscape.

It is therefore highly desirable to provide ethylene polymer compositions which would degrade more rapidly upon exposure to the elements than conventional ethylene polymer compositions. Yet it is also desirable that articles of such degradable compositions substantially retain the good physical properties initially in order that they perform the primary function for which they were produced.

SUMMARY OF THE INVENTION

Accordingly, the present invention is a photodegradable ethylene polymer composition which substantially retains the physical properties of the ethylene polymer during fabrication and normal usage, but, upon exposure to sunlight and other ultraviolet light sources, such composition degrades at a much faster rate than the conventional ethylene polymer. As a result of such rapid degradation, articles of said degradable compositions embrittle and are readily broken up by normal forces of the environment.

The novel compositions of the present invention comprise a predominant amount of ethylene polymer and amounts of a photosensitizing material for the ethylene polymer and propylene polymer sufficient to accelerate degradation of the ethylene polymer upon exposure to ultraviolet light.

In another aspect, the present invention is a method of using the aforementioned composition which method comprises fabricating a shaped article of said composition and exposing said article to conditions of ultraviolet light and the like such that said article is degraded to the point of embrittlement.

It has been found that compositions of ethylene polymer and photosensitizing material degrade at a more rapid rate than the pure ethylene polymer. Above a certain relatively low concentration (so-called "maximum effective concentration") of the photosensitizing material in the ethylene polymer, the rate of degradation is not appreciably increased by the incorporation of more photosensitizing material into the ethylene polymer. Surprisingly, however, the incorporation of propylene polymer into the ethylene polymer containing maximum effective concentration of photosensitizing material does substantially increase the rate of degradation of the ethylene polymer containing said photosensitizing material.

The novel degradable compositions of the present invention are particularly useful as molding and extrusion compositions for the production of any disposable article conventionally produced from polyethylene and other ethylene polymers. Exemplary disposable articles include containers such as cups, bags, cartons, tubs, bowls, pots and baskets; mulch films for use in agriculture; wrapping films; boxes and the like.

DESCRIPTION OF THE PREFERRED EMBODIMENTS

The preferred compositions of the present invention comprise a predominant amount of ethylene polymer, a minor amount of propylene polymer and an amount of photosensitizing material sufficient to measurably enhance photodegradability of the ethylene polymer without having a substantial, deleterious effect on physical properties of the ethylene polymer prior to exposure to ultraviolet light. Especially preferred compositions comprise at least about 75 weight percent of ethylene polymer based on total polymer, from about 1 to about 25 weight percent of propylene polymer based on total polymer and from about 25 to about 25,000 parts per million of a photosensitizing material based on the ethylene polymer.

By "ethylene polymer" is meant normally solid ethylene polymer suitable for molding or similar fabrication and includes the high and low density homopolymers of ethylene and copolymers of ethylene in predominant amount with minor amounts of other copolymerizable aliphatic α-olefins having from 3 to 18 carbon atoms, and mixtures and blends thereof. Such ethylene polymers preferably have melt indexes as determined by ASTM D-1238-65 T(E) in the range of from about 0.1 to about 50 decigrams/minute and densities in the range of from about 0.910 to about 0.990 grams/cubic centimeter. Methods for the preparation of such ethylene polymers are well known in the art as taught by Schildknecht, Polymer Processes, Vol. X (1956).

Polymers of propylene suitably employed in the practice of this invention include homopolymers of propylene and copolymers of propylene and ethylene and/or other ehtylenically unsaturated monomers, particularly, the α-monoolefins having 4–18 carbon atoms. Most beneficial propylene polymers are those wherein the polymerized propylene moiety constitutes at least about 50 weight percent of the polymer, said polymers having molecular weight within the range of from about 10,000 to about 1,000,000. Preferably, homopolymers of propylene, inclusive of the atactic, isotactic and syndiotactic varieties, are employed. An especially preferred polypropylene is isotactic polypropylene having a melt flow rate in the range of from about 1 to about 20 decigrams/minute as determined by ASTM D-1238-65T(L) and density in the range of from about 0.860 to about 0.920 grams/cubic centimeter. Methods for preparing such propylene polymers are well known as disclosed in Schildknecht, Polymer Processes, Vol. X (1956).

By photosensitizing material is meant any material known to become activated to catalysts in the presence of ultraviolet light and act to promote the degradation of ethylene polymers containing them upon exposure to outdoor weathering. Any material of this type which does not adversely affect the other desirable properties of the ethylene polymer compositions of this invention is suitable within the scope of the present invention. Such materials include agents which promote oxidation of hydrocarbons and/or which, when activated by the action of ultraviolet light, tend to depolymerize or degrade the ethylene polymers which contain them.

Preferred photosensitizing materials include aromatic ketones having from 8 to 40 carbon atoms such as benzophenone, anthrone, meta-hydroxybenzophenone, para-hydroxybenzophenone, and the like; aromatic ammonium compounds such as methylene blue and alizarin cyanine green; aliphatic ketones having from about 6 to about 40 carbon atoms such as hexanone, octanone, dodecanone and the like; aliphatic and aromatic aldehydes having from about 6 to about 40 carbon atoms such as heptaldehyde, capronaldehyde, benzaldehyde, salicylaldehyde and the like.

It is understood that such photosensitizing materials are to be employed in amounts which accelerate degradation of the ethylene polymer even in the absence of polypropylene, but which do not deleteriously affect the initial physical properties of the ethylene polymer. It is further understood that, at certain high concentrations of photosensitizing material, addition of more photosensitizing material does not further accelerate degradation of the ethylene polymer. Therefore it is understood that amounts of photosensitizing material in excess of such a high concentration are generally not desirable to employ. While the numerical concentration required to satisfy these requirements varies with the particular photosensitizing material, concentrations of photosensitizing material in the range of from about 25 to about 15,000 p.p.m. based on the ethylene polymer are generally advantageous, with concentrations in the range of from about 500 to about 2500 p.p.m. being preferred.

The photosensitizing material and the propylene polymer may be incorporated into the ethylene polymer in any order by any of the techniques known for blending a solid, a liquid or polymeric material with a polymer and solid or liquid component prior to fabrication into shaped articles. For example, the desired amount of photosensitizing material and propylene polymer can by dry blended with the polymer and, if desired, further blended on a high temperature mixing device such as a hot roll mill. Or, the aforementioned ingredients in solution and/or dispersion can be admixed with a solution or dispersion of the ethylene polymer in a suitable solvent. The temperature of blending of the aforementioned ingredients with the ethylene polymer is not particularly critical so long as the thermal degradation point of the ethylene polymer or the propylene polymer or the thermal decomposition temperature of the photosensitizing material is not reached.

In addition to the aforementioned critical ingredients, it is understood that optional additives such as plasticizers, fillers and the like can also be incorporated into the compositions of this invention.

The resultant ethylene polymer compositions of this invention are then fabricated by molding, extrusion and the like into any of a wide variety of shaped articles such as films for use in agriculture, e.g., so-called mulch films; disposable cartons and containers for packaging, e.g., disposable carriers or holders for canned and bottled beverages and other liquids; packaging films, and other applications of ethylene polymers wherein disposal of the polymeric remains is a problem.

Fabricated ethylene polymer compositions in accordance with this invention have relatively poor stability to ultraviolet light and within a predictable time in the presence of sunlight and other weathering conditions degrade to the extent that shaped articles of these compositions become discolored, hard, and brittle, and eventually break and/or crumble into small particles.

The following examples are provided to illustrate the invention and should not be considered as limiting its scope. All parts and perecntages are by weight unless otherwise indicated. Melt indexes of the ethylene polymers are determined in accordance with ASTM D-1238-65T(E) and melt flow rates of propylene polymers are determined in accordance with ASTM D-1238-65T(L).

Example 1

Several compositions (Sample Nos.1-8) are prepared by dry blending polyethylene having a density of 0.920 g./cc. and melt index of 1 decig./min. polypropylene having a density of 0.890 g./cc. and a melt flow rate of 7 decig./min., and anthrone in the proportions specified in Table I. The resultant dry blended materials are then compounded in a polymer mixer at 450° F. for a period of 15 min. The resulting polymer specimens (test tabs 1½" x ½" x 1/16") are tested for degradability and the results are recorded in Table I.

For the purposes of comparison, several compositions (Sample Nos. $A_1$–$A_3$) are prepared in a manner similar to that of the preceding paragraph using the polyethylene and anthrone in proportions specified in Table I. These compositions are also tested for degradability and the results are recorded in Table I.

As a control composition (Sample No. $C_1$), polyethylene identical to that in the aforementioned compositions is worked in the polymer mixer at 450° F. for 15 min. and then tested for degradability. The result of this test is also recorded in Table I.

TABLE I

| Sample number | Additives | | Degradability, percent elongation,[3] after— | | | | |
|---|---|---|---|---|---|---|---|
| | Polypropylene percent[1] | Anthrone, p.p.m.[2] | 0 wks. | 3 wks. | 6 wks. | 11 wks. | 17 wks. |
| 1 | 5 | 500 | 450 | 400 | 400 | 225 | 60 |
| 2 | 10 | 500 | 450 | 450 | 450 | 130 | 25 |
| 3 | 12.5 | 500 | 400 | 150 | 150 | 50 | 25 |
| 4 | 5 | 1.000 | 400 | 400 | 280 | 50 | 25 |
| 5 | 10 | 1.000 | 400 | 300 | 275 | 100 | 25 |
| 6 | 25 | 1.000 | 425 | 250 | 250 | 125 | 25 |
| 7 | 5 | 2.500 | 400 | 350 | 400 | 250 | 75 |
| 8 | 12.5 | 2.500 | 325 | 375 | 100 | 75 | 25 |
| $A_1$* | 0 | 500 | 450 | 400 | 400 | 300 | 100 |
| $A_2$* | 0 | 1.000 | 450 | 450 | 425 | 430 | 100 |
| $A_3$* | 0 | 2.500 | 400 | 350 | 400 | 375 | 100 |
| $C_1$* | 0 | 0 | 500 | 500 | 500 | 500 | 500 |

[1] Weight percent polypropylene based on total weight of polyethylene and polypropylene.
[2] Parts per million based on weight of polyethylene.
[3] Each sample test tab is exposed to identical outdoor weathering for the time indicated. Degradability is determined after the indicated period by measuring the percent elongation in accordance with ASTM D-638. A value less than 25 indicates a brittle product which breaks and crumbles upon slight flexure. Results are given as the average percent elongation for three test tabs.
*Not an example of the invention.

Example 2

Several compositions as described in Example 1 are also tested for degradability using accelerated ultraviolet light exposure instead of outdoor weathering to achieve degradation. The results of these tests are recorded in Table II.

TABLE II

| Sample number | Additives | | Degradability, percent elongation,[3] after— | | | | | | | | | |
|---|---|---|---|---|---|---|---|---|---|---|---|---|
| | Polypropylene, (percent)[1] | Anthrone, p.p.m.[2] | 0 days | 1 day | 2 days | 3 days | 6 days | 7 days | 8 days | 9 days | 10 days | 13 days |
| 1 | 5 | 500 | 500 | 450 | 400 | ------ | 100 | 100 | 100 | 50 | 25 | ------ |
| 2 | 10 | 500 | 500 | 500 | 450 | ------ | 100 | 75 | 50 | 25 | 25 | ------ |
| 4 | 5 | 1,000 | 450 | 450 | 400 | 250 | 100 | 100 | ------ | 50 | 50 | 25 |
| 5 | 10 | 1,000 | 500 | 450 | 325 | 270 | 75 | 50 | 50 | 25 | 25 | 25 |
| 6 | 25 | 1,000 | 375 | 200 | 125 | 125 | 50 | 50 | 50 | ------ | ------ | 25 |
| 7 | 5 | 2,500 | 450 | 400 | 425 | 275 | 125 | 100 | 100 | 50 | 50 | 25 |
| $A_1^*$ | 0 | 500 | 450 | 400 | 400 | ------ | 100 | 100 | 100 | 100 | 50 | ------ |
| $A_2^*$ | 0 | 1,000 | 550 | 450 | 450 | 400 | 300 | 180 | 150 | 175 | 100 | 75 |
| $A_3^*$ | 0 | 2,500 | 500 | 400 | 400 | 375 | 375 | 75 | 125 | 100 | 75 | 50 |
| $C_1^*$ | 0 | 0 | 500 | 500 | 500 | 500 | ------ | 500 | ------ | ------ | ------ | ------ |

[1][2] Same as in Table I.
[3] Each sample test tab is exposed to identical ultra violet light (275 watts) for the times indicated. Degradability is determined after the indicated period by measuring the percent elongation in accordance with ASTM D-638. A value less than 25 indicates a brittle product which breaks and crumbles upon slight flexure. A dash means no data are obtained under the conditions specified. Results are given as the average percent elongation for three test tabs.
*Not an example of the invention.

Example 3

Several compositions (Sample Nos. 9–12) are prepared using the polyethylene and the polypropylene of Example 1 and diffenert photosensitizing materials as indicated in Table III. The compositions are prepared in the manner set forth in Example 1 and tested for degradability as in Example 2. The results of these tests are recorded in Table III.

For comparative purposes, compositions (Sample Nos. $A_4$–$A_7$) of the polyethylene and the photosensitizing materials are also prepared and tested for degradability, and the results are recorded in Table III.

A control sample ($C_1$) of the polyethylene is also tested for degradability and the results are recorded in Table III.

TABLE III

| Sample number | Polypropylene, percent [1] | Photosensitizing material, p.p.m.[2] | Species of photosensitizing material | Degradability,[3] time in days for 50% loss of elongation |
|---|---|---|---|---|
| 9 | 10 | 25 | Fluorescein (free acid) [a] | 4.0 |
| 10 | 10 | 2,500 | do.[a] | 4.5 |
| 11 | 10 | 25 | Benzophenone | 6.5 |
| 12 | 10 | 2,500 | do | 6.0 |
| 13 | 10 | 25 | Methylene blue [b] | 3.5 |
| 14 | 10 | 2,500 | do.[b] | 3.0 |
| 15 | 10 | 25 | Alizarine cyanine green [c] | 4.0 |
| 16 | 10 | 25 | Erythrosin, bluish [d] | 5.0 |
| 17 | 10 | 2,500 | Anthrone | 4.5 |
| $A_4^*$ | 0 | 25 | Fluorescein (free acid) [a] | 10 |
| $A_5^*$ | 0 | 2,500 | do.[a] | 8 |
| $A_6^*$ | 0 | 25 | Benzophenone | 10 |
| $A_7^*$ | 0 | 2,500 | do | 10 |
| $A_8^*$ | 0 | 25 | Methylene blue [b] | 10 |
| $A_9^*$ | 0 | 2,500 | do.[b] | >10 |
| $A_{10}^*$ | 0 | 25 | Alizarine cyanine green [c] | >10 |
| $A_{11}^*$ | 0 | 25 | Erythrosin, bluish [d] | >10 |
| $A_{12}^*$ | 0 | 2,500 | Anthrone | 7.5 |
| $C_1^*$ | 0 | 0 | None | >10 |

[1][2] Same as in Table I.
[3] Percent elongation measured in accordance with ASTM D-638 with results given a the average percent elongation for three test tabs.

[a] See the following formula:

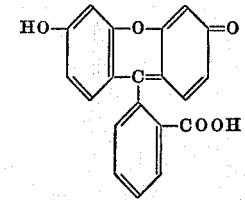

[b] Zinc double chloride of—

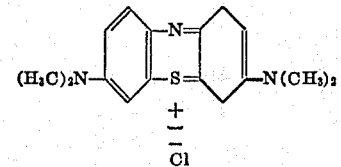

TABLE III—Continued

| Sample number | Polypropylene, percent [1] | Photosensitizing material, p.p.m.[2] | Species of photosensitizing material | Degradability,[3] time in days for 50% loss of elongation |
|---|---|---|---|---| c See the following formula:

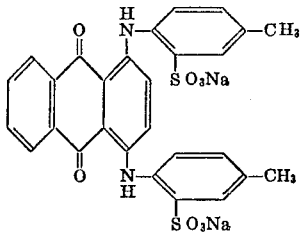

d See the following formula:

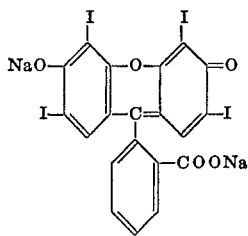

*Not an example of the invention.

What is claimed is:

1. A photodegradable ethylene polymer composition comprising at least about 75 weight percent of ethylene polymer having a predominant amount of ethylene and amounts of an aromatic ketone selected from the group consisting of anthrone, benzophenone, meta-hydroxy benzophenone and para-hydroxybenzophenone and polypropylene effective to accelerate degradation of the ethylene polymer upon exposure to ultraviolet light, said amount of polypropylene being in the range from about 1 to about 25 weight percent of total polymer.

2. The photodegradable ethylene polymer composition according to Claim 1 comprising at least about 75 weight percent of ethylene polymer selected from the group consisting of homopolymers of ethylene and copolymers of a predominant amount of ethylene with minor amounts of other copolymerizable aliphatic α-olefins having from 3 to 18 carbon atoms, from about 1 to about 25 weight percent of polypropylene and from about 25 to about 15,000 parts per million based on the weight of said ethylene polymer of said aromatic ketone.

3. The composition according to Claim 2 wherein the ethylene polymer is polyethylene.

4. The composition according to Claim 3 wherein the ketone is anthrone.

5. The composition according to Claim 3 wherein the ketone is benzophenone.

References Cited

UNITED STATES PATENTS

| 3,663,662 | 5/1972 | Golike et al. | 260—897 A |
| 2,484,529 | 10/1949 | Roedel | 204—159.2 |
| 3,320,695 | 5/1967 | Moore | 260—897 A |
| 3,299,181 | 1/1967 | Coover et al. | 260—897 A |
| 3,219,566 | 11/1965 | Potts et al. | 204—159.2 |
| 3,679,777 | 7/1972 | Lambert | 260—897 A |
| 3,607,828 | 9/1971 | Hussey | 260—45.75 N |

HARRY WONG, Jr., Primary Examiner

U.S. Cl. X.R.

204—159.2; 260—45.7 R, 45.8 SN, 45.9 R, 45.95, Digest 43